(12) United States Patent
Van Druten et al.

(10) Patent No.: US 11,867,288 B2
(45) Date of Patent: Jan. 9, 2024

(54) HYDRAULIC SYSTEM FOR A VEHICLE TRANSMISSION

(71) Applicant: Punch Powertrain PSA e-transmissions NV, Sint-Truiden (BE)

(72) Inventors: Roell Marie Van Druten, Eindhoven (NL); Peter Mark Smid, Eindhoven (NL)

(73) Assignee: Punch Powertrain PSA e-transmissions NV, Sint-Truiden (BE)

( * ) Notice: Subject to any disclaimer, the term of this patent is extended or adjusted under 35 U.S.C. 154(b) by 302 days.

(21) Appl. No.: 17/241,778

(22) PCT Filed: Oct. 28, 2019

(86) PCT No.: PCT/EP2019/079363
§ 371 (c)(1),
(2) Date: Apr. 27, 2021

(87) PCT Pub. No.: WO2020/089153
PCT Pub. Date: May 7, 2020

(65) Prior Publication Data
US 2023/0097586 A1 Mar. 30, 2023

(30) Foreign Application Priority Data
Oct. 29, 2018 (BE) .................................. 2018/5750

(51) Int. Cl.
*F16H 63/34* (2006.01)
*F16H 63/48* (2006.01)
*F16H 61/00* (2006.01)

(52) U.S. Cl.
CPC ....... *F16H 63/483* (2013.01); *F16H 61/0031* (2013.01); *F16H 63/3483* (2013.01); *F16H 2061/005* (2013.01)

(58) Field of Classification Search
CPC .............. F16H 63/483; F16H 63/3483; F16H 61/0031; F16H 2061/005
See application file for complete search history.

(56) References Cited

U.S. PATENT DOCUMENTS

| 2014/0110216 A1* | 4/2014 | Pollack ............... F16H 63/3483 |
| | | 192/219.4 |
| 2019/0309847 A1* | 10/2019 | Merklein ............ F16H 63/3483 |
| 2021/0180692 A1* | 6/2021 | Kaiserauer ............ F16H 63/483 |

FOREIGN PATENT DOCUMENTS

| CN | 107428318 A | 12/2017 |
| CN | 107636365 A | 1/2018 |

(Continued)

OTHER PUBLICATIONS

Thilo, Schmidt, et al., Espacenet translation of german document DE102016208458. Espacenet.2017 (Year: 2017).*

(Continued)

*Primary Examiner* — Lori Wu
(74) *Attorney, Agent, or Firm* — Banner & Witcoff, Ltd.

(57) ABSTRACT

The invention relates to a hydraulic system for a vehicle transmission, comprising: a hydraulic circuit arranged for generating a pressure, a hydraulic actuator arranged for engaging a park lock system, wherein the hydraulic actuator is hydraulically connected to the hydraulic circuit for actuation of the hydraulic actuator using the pressure, and a back-up system configured to keep the pressure above a predetermined pressure threshold for maintaining an actuation of the hydraulic actuator for a predetermined period of time in case of an operational interruption of a transmission control unit of the vehicle.

23 Claims, 6 Drawing Sheets

(56) References Cited

FOREIGN PATENT DOCUMENTS

| | | |
|---|---|---|
| CN | 107781412 A | 3/2018 |
| DE | 19943519 A1 | 3/2001 |
| DE | 102016208458 A1 | 11/2017 |
| EP | 2469129 A1 | 6/2012 |
| JP | 2017166637 A | 9/2017 |

OTHER PUBLICATIONS

International Search Report and Written Opinion—PCT/EP2019/079363—dated Jan. 7, 2020.

* cited by examiner

HYDRAULIC SYSTEM FOR A VEHICLE TRANSMISSION

CROSS-REFERENCE TO RELATED APPLICATIONS

This application is a U.S. National Stage application under 35 U.S.C. § 371 of International Application PCT/EP2019/079363 (published as WO 2020/089153 A1), filed Oct. 28, 2019, which claims the benefit of priority to Application BE2018/5750, filed Oct. 29, 2018. Benefit of the filing date of these prior applications is hereby claimed. Each of these prior applications is hereby incorporated by reference in its entirety.

FIELD OF THE INVENTION

The invention relates to a hydraulic system for a vehicle transmission, and a vehicle transmission including a hydraulic system. The invention further relates to a method for operating a park lock system of a vehicle transmission. Furthermore, the invention relates to a vehicle with a transmission.

BACKGROUND TO THE INVENTION

A transmission enables a controlled application of engine power by conversion of speed and torque from a power source, such as for example an electric engine, internal combustion engine, a hybrid engine, etc. A hydraulic system of a vehicle transmission may provide for actuation of friction elements in the transmission for coupling the transmission input to a geartrain so as to transmit engine power to the wheels of the vehicle. For example a clutch module in an automatic transmission system can comprise two friction clutches for coupling the engine via the geartrain to the wheels by actuation of these clutches via said hydraulic system. In a variant one or more clutches can be made by using a powersplit mechanism with three rotational members where one member is connected to the input, one member is connected to the output and the third member can be connected to the transmission housing by means of actuation of a friction brake. Multiple configurations of these friction elements (clutch, brake) can be made resulting in various layouts of multi-friction transmissions.

A hydraulic system for a vehicle transmission can include a first hydraulic circuit arranged for generating a line pressure, and a hydraulic actuator arranged for actuating a park lock system, wherein the hydraulic actuator is hydraulically connected to the first hydraulic circuit for direct actuation of the hydraulic actuator using the line pressure. Typically, the controller for the one or more pumps generating the line pressure in the first hydraulic circuit are included in the transmission control unit (TCU). Hence, an operational interruption of the TCU can have detrimental effects on the operation of the park lock system. In some cases, a park state of the park lock system may be inadvertently engaged.

There is a need for a hydraulic system for a multiple friction transmission that addresses at least one of the above mentioned drawbacks.

SUMMARY OF THE INVENTION

It is an object of the invention to provide for a method and a system that obviates at least one of the above mentioned drawbacks.

Additionally or alternatively, it is an object of the invention to provide for an improved park lock system.

Thereto, the invention provides for a hydraulic system for a vehicle transmission, comprising: a hydraulic circuit arranged for generating a pressure, a hydraulic actuator arranged for engaging a park lock system, wherein the hydraulic actuator is hydraulically connected to the hydraulic circuit for actuation of the hydraulic actuator using the pressure, a back-up system configured to keep the pressure above a predetermined pressure threshold for maintaining an actuation of the hydraulic actuator for a predetermined period of time in case of an operational interruption of a transmission control unit of the vehicle.

In case of an interruption of the operation of the transmission control unit (TCU), the pressure needed for keeping the hydraulic actuator actuated can be maintained using the back-up system. In this way a predetermined period of time can be bridged in which the hydraulic actuator is remains hydraulically actuated. This predetermined period of time may be selected such as to cover typical operational interruption time periods, such as for instance one or more successive TCU resets.

If the TCU is being reset, then the electrical pump can continue to pump and there is no locking feature needed in the park-lock system arranged for maintaining the hydraulic line pressure during said operational interruption (reset) of the TCU. The pump can have a back-up power supply for providing an independent power supply for a predetermined period of time covering at least one TCU reset. Optionally, a plurality of TCU resets can be covered in the predetermined period of time.

The back-up system can keep the pressure above a predetermined pressure threshold for maintaining the actuation of the hydraulic actuator for keeping the park lock in an unarmed or armed position (depending on the system), for a predetermined period of time in case of an operational interruption of a transmission control unit of the vehicle.

During one or more successive TCU retest, the electrical pump can provide a sufficiently high pressure such that the park lock can stay unarmed or armed. If the one or more successive TCU resets take a longer time than the predetermined period of time, the pressure may become smaller than the pressure required for actuation of the hydraulic actuator. The TCU may be configured to go into a sleep modus after a number of successive TCU resets.

Optionally, the pump is configured to provide a hydraulic pressure below a clutch kisspoint pressure, but at or above a level needed for actuation of the hydraulic actuator (cf. park-lock system disarming level). As a result, there is no safety risk during one or more TCU resets. The time period required for the TCU reset is covered by means of the back-up system. The coupling members of the transmission may not be able to transfer torque under the kiss point pressure.

Optionally, the hydraulic circuit is arranged for generating the pressure by means of an electric pump, the electric pump being operated by means of a pump controller, wherein the back-up system includes an energy storage unit configured to store an amount of energy usable for independently powering at least the electric pump controller for the predetermined period of time, wherein in case of the operational interruption of the transmission control unit, the operation of the electric pump is maintained by means of the pump controller such that the pressure remains above the predetermined pressure threshold for maintaining the park lock system in position during said predetermined period of time.

The energy storage unit can be arranged for storing electric energy usable for powering the electric pump controller for the predetermined period of time. In this way, an operational interruption of the transmission control unit (e.g. TCU resets) can be effectively bridged using the back-up system.

A TCU reset may cause an interruption in the operation of the TCU. The electrical pump can be controlled by a pump controller, wherein a back-up system is employed for providing operational continuity during one or more TCU resets.

During the TCU reset, the last setpoint of the park-lock system can be held. If TCU resets successfully, then the operation of the park-lock system can be continued by means of the TCU.

The park-lock system may be arranged to go to park in case of a power failure (e.g. battery failure) for an extended period of time (e.g. longer than 50 ms).

It may be possible that the TCU keeps resetting itself, for instance as a result of a software crash caused by a hardware component failure (e.g. sensor). After the predetermined period of time is lapsed, the operation of the pump may be turned off.

Optionally, the capacitor is configured to provide further damping of electrical current oscillations.

Optionally, the park lock system is maintained in a non-park position or park position. The back-up system may be configured to keep the pressure above the predetermined pressure threshold for maintaining the actuation of the hydraulic actuator in non-park position or park position for the predetermined period of time in case of an operational interruption of a transmission control unit of the vehicle.

Optionally, the predetermined period of time in which the operation of the electric pump is maintained covers a duration required for performing one or more resets of the transmission control unit.

During the one or more TCU resets, the pump can still be driven and operated by means of the back-up system. For instance, the pump can be driven to bridge a predetermined period of time covering approximately at least three TCU resets.

Optionally, the energy storage unit includes a capacitor configured to be charged during normal operation, wherein the capacitor is configured to discharge the stored amount of electrical energy such as to enable continuation of the operation of the electric pump during the predetermined period of time.

The electromotor of the electrical pump can have an independent short-term power supply configured to provide power for a larger time period than a typical time interval needed for an operational interruption of the TCU (e.g. TCU reset).

The energy storage unit may be rechargeable. The energy storage unit may be recharged during normal operation of the transmission control unit. For instance, after a TCU reset, wherein energy from the energy storage unit is used for maintaining the operation of the electrical pump, the energy storage unit may be recharged such as to be able to handle later possible one or more operational interruptions of the TCU.

The energy storage unit may have a storage circuit including at least one capacitor for storing electrical energy. During a normal phase of an operating period, energy can be stored in the energy storage unit. During an operational interruption of the TCU, the operation of the pump controller can be maintained using the stored power from the energy storage unit, wherein the pump controller is powered until the power stored in the energy storage unit is expended. The energy storage capacity of the energy storage unit can be sufficiently large for powering the pump controller during one or more successive TCU resets.

The TCU may not be able to communicate with other subsystems of the vehicle during TCU resets. For instance, during TCU resets, controller area network (CAN) messages may no longer be transmitted. However, the electrical pump may continue its operation (pumping) for a predetermined period of time. Advantageously, this predetermined period of time covers at least one TCU reset.

Optionally, the energy storage unit includes a voltage regulator in parallel with the capacitor.

Advantageously, it can be more robust to use a capacitor. Furthermore, arranging a capacitor may also provide a cheaper and simpler design compared to for instance a chemical battery design. For instance, a lithium battery can be subject to degradation.

Optionally, the energy storage unit is configured to provide energy continuity by means of a rechargeable battery.

Optionally, the predetermined period of time includes 1 to 5 times a duration required for performing one transmission control unit reset.

The back-up system can be configured to maintain actuation for a limited predetermined period of time after the operational interruption of the transmission control unit.

Optionally, the predetermined period of time is in a range of 20 to 2000 ms, more preferably between 50 to 1000 ms, even more preferably between 100 to 300 ms. These ranges may cover the time required for carrying out one or more TCU resets.

In normal conditions, the electrical pump controller may be powered by a TCU power output. During an operational interruption of the TCU, for instance caused by a TCU reset, the TCU power output can be low. The energy storage unit of the back-up system may include a capacitor for independently powering the electric pump controller for a predetermined period of time. The capacitor can be recharged during normal conditions.

In an example, a brushless direct current motor is used for the electrical pump. The pump controller may be a brushless direct current motor control unit (BLDC). The BLDC engine control unit may be powered by a TCU switched power output with capacitor. During an operational interruption of the TCU, the energy storage unit of the back-up system can keep the power input to the pump controller high for the predetermined period of time (e.g. even though the power output of the TCU is low during a TCU reset).

Optionally, the energy storage unit is integrated in the TCU.

Optionally, the electric pump controller is separate from the transmission control unit.

The electric pump controller may be independently operable with respect to the TCU. It can thus be prevented that an operational interruption of the TCU (e.g. reset) would prevent the operation of the electric pump controller.

Optionally, the electric pump controller is arranged at the electric pump.

The electric pump controller can enable independent operation of the electric pump. The electric pump controller may be positioned at a different physical location than the transmission control unit. Optionally, the electric pump controller is integrated with the electric pump. The electric pump controller may be embedded hardware of the electric pump.

Optionally, the hydraulic actuator is arranged for bringing or maintaining the park lock system in a park position when the pressure is below the predetermined pressure threshold. This can be particularly advantageous in view of safety norms.

Optionally, the hydraulic actuator includes an actuator arranged for maintaining the park lock system in a park position or in a non-park position according to a last input of an operator of the hydraulic system when the pressure is below the predetermined pressure threshold.

Optionally, a locking element is connected to the hydraulic actuator configured for at least one of the two purposes: in order to keep a park lock unarmed when the line pressure accidentally drops (e.g. by a TCU reset) below a predetermined threshold and to keep the park lock unarmed for the purpose of safety, or in order to keep the park lock armed when the line pressure accidentally increases above a predetermined threshold and to keep the park lock armed for the purpose of safety.

The locking element may be an electro-mechanical actuator (e.g. electrical solenoid). Optionally, the locking element is normally open, so in case there is no electricity or power available, the locking element will not lock the hydraulic actuator and the park lock will still get in an armed position in such case.

Optionally, the hydraulic actuator is arranged for bringing or maintaining the park lock system in a non-park position when the line pressure is below the predetermined pressure threshold.

Optionally, the pump controller is integrated with the pump for regulating the line pressure independently. Adverse effects on the operation of the pump as a result of one or more TCU resets can thus be avoided.

The pump may be controlled by means of a controller area network (CAN). During a TCU reset, the pump may not receive CAN messages for maintaining its operation. The pump controller can keep working during a TCU reset, such that the operation of the pump can be maintained.

Optionally, a single solenoid is used for both locking and override of the park-lock system. Override of the park-lock system may for instance be desired during towing of the vehicle, movement of the vehicle in the factory, carwash, etc.

According to an aspect, the invention provides for a vehicle transmission, including a hydraulic system, for instance according to the invention, comprising: a park lock system arranged to engage park lock when pressure is below a predetermined threshold and/or electric power is off; and an override means for overriding the park lock system such that the park lock system can be selectively disengaged in case pressure is below the predetermined threshold and/or electric power is off.

The hydraulic pressure in the hydraulic circuit can be provided by an electronically controlled electrical pump. The pump may be controlled or operated by means of a pump controller. The pump controller may be configured to function independently from the TCU. Optionally, the pump controller is arranged separately from the TCU. For instance, the pump controller may be arranged at or near the pump itself.

Advantageously, the electrical pump can remain operated in case of one or more TCU resets. During the one or more TCU resets, the pump controller may still be operated for controlling the electrical pump. The pump controller may for instance be a dedicated controller for the electrical pump, or may be arranged to operate also other units such as another pump.

Optionally, the override means is arranged to be switched out of override, bringing the park lock system back from an unengaged position to normal behavior.

Optionally, the override means and the park lock system use a same actuator for maintaining the park lock system in a park position or non-park position and for overriding the park lock system.

Optionally, the override means uses a separate override actuator.

Optionally, the override means include retaining means for mechanically preventing releasing of the override means upon deactivating of the override means.

Optionally, the override system is arranged to selectively maintain the park lock in a non-park position and/or a park position.

Optionally, the override system is arranged to maintain the park lock in a non-park position and/or a park position without using an electric power.

Optionally, the override system is arranged to be switched to override using the transmission control unit.

Optionally, the vehicle transmission includes two or more friction elements, the hydraulic circuit being arranged for actuating the two or more friction elements using the pressure, wherein during the predetermined period of time, the pump controller operates the electric pump such that the pressure is reduced below a kiss point for the two or more friction elements.

According to an aspect, the invention provides for a method for operating a park lock system of a vehicle transmission, including: generating a pressure using a hydraulic circuit, providing a hydraulic actuator arranged for engaging the park lock system, the hydraulic actuator being hydraulically connected to the hydraulic circuit for actuation of the hydraulic actuator using the pressure, wherein a back-up system is employed for keeping the pressure above a predetermined pressure threshold for maintaining an actuation of the hydraulic actuator for a predetermined period of time in case of an operational interruption of a transmission control unit of the vehicle.

Optionally, the pressure is generated using an electric pump, and wherein the back-up system is provided for storing an amount of energy used for independently powering at least the electric pump controller for the predetermined period of time, wherein in case of the operational interruption of the transmission control unit, the operation of the electric pump is maintained by means of the pump controller such that the pressure remains above the predetermined pressure threshold for maintaining the park lock system in position during said predetermined period of time.

The energy storage unit may include an electrical circuit with one or more capacitors arranged for providing an intermediate storage of energy for powering at least the pump controller in the case of a brief switch-off or reset of the TCU (cf. operational interruption). The energy storage unit can produce the voltage required for guaranteeing the operation of the pump controller for a predetermined period of time covering at least one TCU reset. The capacitor of the energy storage unit can be charged during normal operation. The capacitor can discharge for providing power continuity in a discharge time period, e.g. in a range of 50-1500 ms.

Optionally, a separate pump controller is arranged at the pump, independent of the TCU. The pump can be operated locally as the pump controller is at the pump.

According to an aspect, the invention provides for a vehicle transmission, including a hydraulic system according to the invention.

According to an aspect, the invention provides for a vehicle comprising a vehicle transmission according to the invention.

A reset of the TCU may be an operational interruption of the TCU. It will be appreciated that operational interruption of the transmission control unit may also be caused by a temporary electric power supply failure of the hydraulic system and/or the vehicle transmission.

It will be appreciated that any of the aspects, features and options described in view of the hydraulic system apply equally to the vehicle transmission and the described method. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
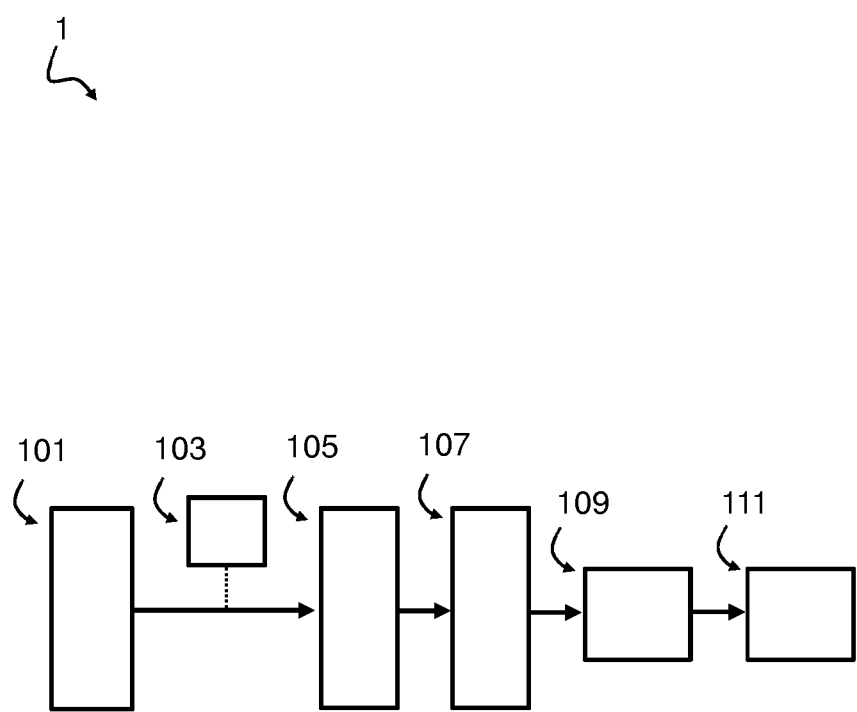
FIG. 1 shows a schematic diagram of an embodiment of a hydraulic system.

FIG. 1 shows a hydraulic system 1 for a vehicle transmission including a transmission control unit 101 (TCU). The TCU 101 is (communicatively) coupled to a pump controller 105. The pump controller 105 is configured for operating an electrical pump 107 arranged in a hydraulic circuit for generating a hydraulic pressure. The hydraulic system 1 includes a hydraulic actuator 109 hydraulically connected to the hydraulic circuit for actuation of the hydraulic actuator 109 using the hydraulic pressure. The hydraulic actuator 109 is arranged for engaging a park lock system 111. The hydraulic system 1 further includes a back-up system 103 configured for keeping the hydraulic pressure above a predetermined pressure threshold for maintaining an actuation of the hydraulic actuator 109 for a predetermined period of time in case of an operation interruption of the TCU 101 (e.g. one or more successive TCU resets).

It will be appreciated that the back-up system is depicted as a standalone unit. However, the back-up system may also be an integrated system, for instance integrated at the TCU 101 and/or at the pump controller 105.

The power supply of the pump can be configured to operate the pump independently for at least a predetermined period of time in case of an operational interruption of the TCU.

The pump controller can be configured such that, during one or more TCU resets, the pump can continue pumping for a certain time (for example, couple of milliseconds or seconds). As a result, no locking is required for certain TCU reset. A capacitor can be used for maintaining the operation of the pump during the one or more TCU resets. The capacitor can maintain the operation for a predetermined period of time if fully charged. When the capacitor is discharged, the pump can stop pumping. Hence, when the TCU reset takes too long, or when the TCU has failed, then the pump can still stop working and the hydraulic line pressure can decrease to a value under a threshold needed for actuation of the hydraulic actuator.

Figure 2:
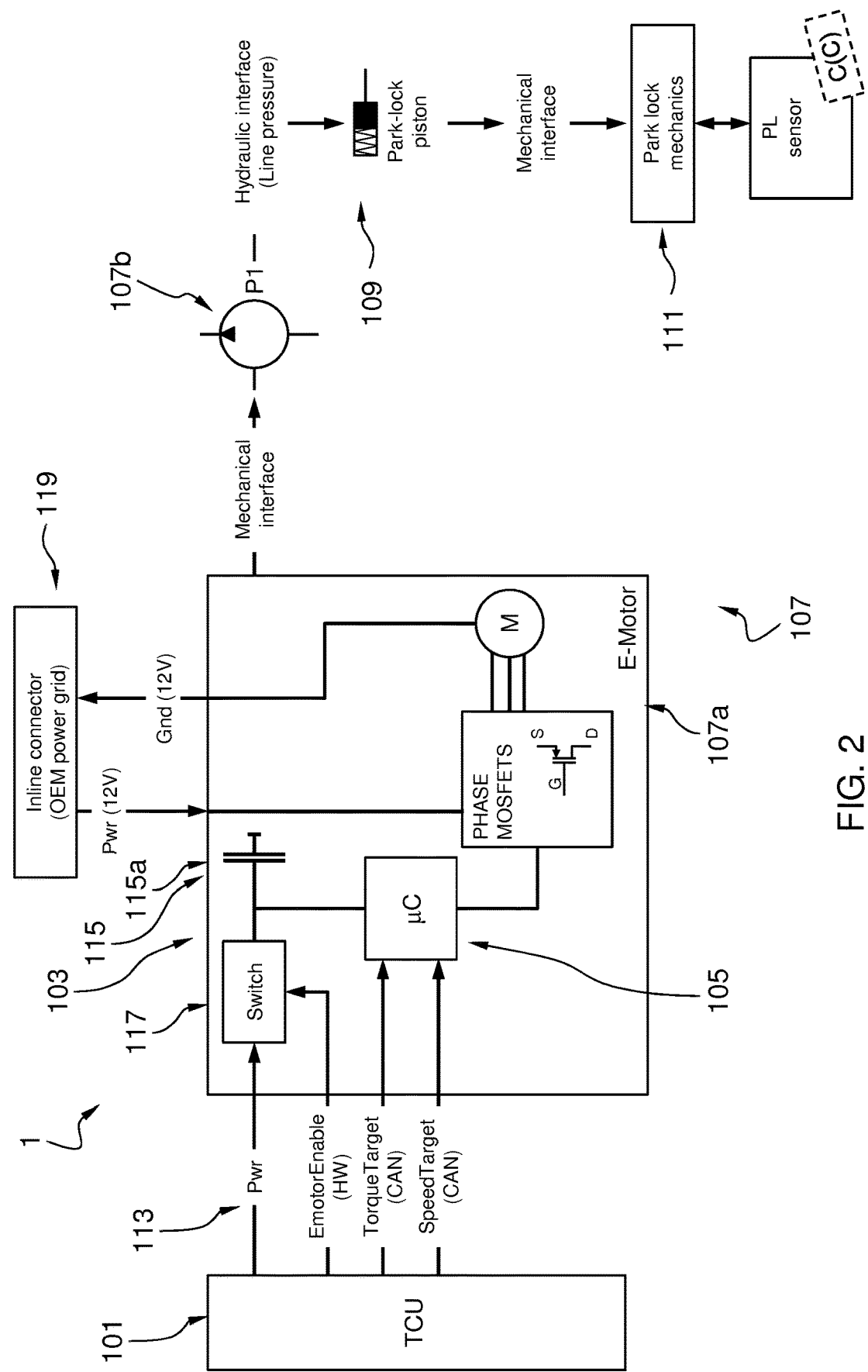
FIG. 2 shows a schematic diagram of an embodiment of a hydraulic system.

FIG. 2 shows a hydraulic system 1 for a vehicle transmission. The hydraulic system 1 includes a transmission control unit 101 (TCU) communicatively coupled to a pump controller 105. The pump controller 105 operates an electrical pump 107 arranged in a hydraulic circuit for generating a hydraulic pressure therein. The electrical pump 107 includes a electrical drive motor 107a and a hydraulic pumping unit 107b. The pumping rate and/or the generated hydraulic pressure can be controlled via the electric drive motor 107a. The electric drive motor 107a is controlled by means of the pump controller 105. In this example, the TCU 101 and the pump controller are separated such that the electric drive motor 107a is not directly operated using the TCU.

The hydraulic system 1 further includes a hydraulic actuator 109 hydraulically connected to the hydraulic circuit for actuation of the hydraulic actuator 109 using the hydraulic pressure generated by means of the electrical pump 107. The hydraulic actuator 109 is arranged for engaging a park lock system 111.

The hydraulic system 1 further includes a back-up system 103 configured for keeping the hydraulic pressure above a predetermined pressure threshold for maintaining an actuation of the hydraulic actuator 109 for a predetermined period of time in case of an operation interruption of the TCU 101 (e.g. one or more successive TCU resets).

The hydraulic circuit is arranged for generating the pressure by means of an electric pump 107 directly operated using the pump controller 105. The back-up system 103 includes an energy storage unit 115 configured to store an amount of energy usable for independently powering at least the electric pump controller 105 for the predetermined period of time, wherein in case of the operational interruption of the transmission control unit (e.g. one or more successive TCU resets), the operation of the electric pump 107 is maintained by means of the pump controller 105 such that the hydraulic pressure remains above the predetermined hydraulic pressure threshold for maintaining the park lock system 111 in position during said predetermined period of time. Optionally, one or more park lock sensors can be arranged for monitoring one or more park lock states of the park lock system 111.

In this embodiment, the TCU 101 has a power output line 113 coupled to the pump controller 105 of the electric drive motor 107a. A switched power output line 113 is obtained using a switch 117. Additionally or alternatively, the power output line 113 is switchable by means of the TCU 101. In an example, the pump controller 105 includes no switch and the power line 113 is switched in the TCU 101. In an alternative example, the pump controller includes a switch 117 and the power output line 113 is also switchable by means of the TCU 101. The energy storage unit 115 includes a capacitor 115a configured to be charged during normal operation. The capacitor 115a is configured to discharge the stored amount of electrical energy such as to enable continuation of the operation of the electric pump 107 during the predetermined period of time. The electric drive motor 107a of the electrical pump 107 is powered by means of a power supply, e.g. a battery.

The pump controller 105 may further be communicatively coupled to the TCU for receiving instructions, such as for example controller area network (CAN) instructions. In this way, the operation of the electrical pump 107 can be controlled by the TCU 101 through the pump controller 105. In case of an operational interruption of the TCU (e.g. reset), the pump may no longer receive power and/or instructions from the TCU. In such a case, the back-up system 103 may keep powering the pump controller 105 for the predetermined period of time. In this way, a TCU reset can be covered, such that during such a reset the hydraulic pressure in and thus the actuation of the hydraulic actuator 109 can be retained.

During TCU reset the pump can continue pumping during the time of a TCU reset. A TCU reset may for instance be between 0.05 to 2 seconds. It will be appreciated that this depends on the TCU and that other values are also possible. In an example, a calculation loop is typically around 10 ms and if it takes more than e.g. 15 ms, then the TCU may be configured to perform a TCU reset. In an example, a TCU reset takes around 200-300 ms.

Figure 3:
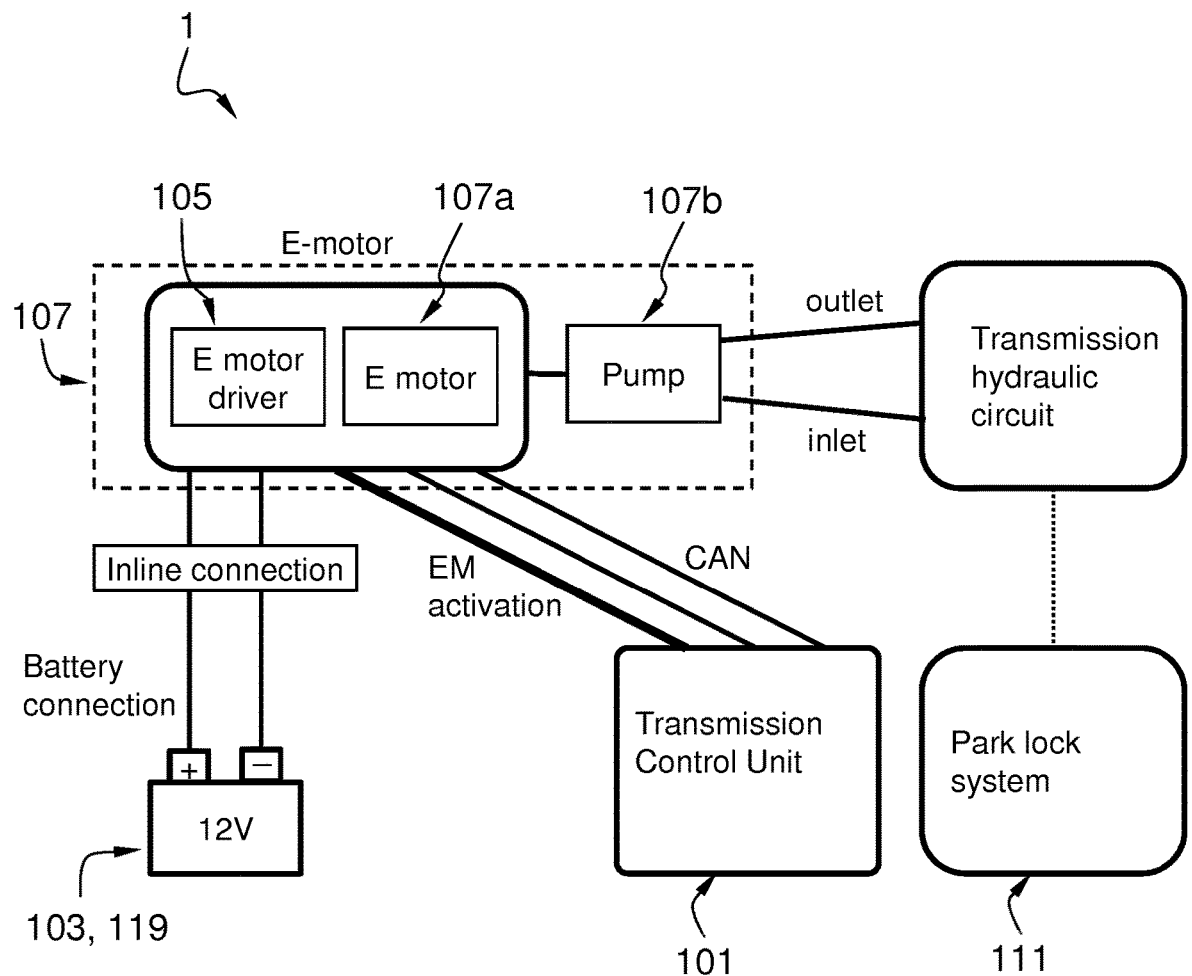
FIG. 3 shows a schematic diagram of an embodiment of a hydraulic system.

FIG. 3 shows a hydraulic system 1 for a vehicle transmission. The hydraulic system 1 includes a hydraulic circuit arranged for generating a pressure, wherein a hydraulic actuator is arranged for engaging a park lock system 111. The hydraulic actuator is hydraulically connected to the hydraulic circuit for actuation of the hydraulic actuator using the generated pressure. A back-up system (not shown) is arranged to retain the pressure above a predetermined pressure threshold for maintaining an actuation of the hydraulic actuator for a predetermined period of time in case of an operational interruption of a TCU of the vehicle. The back-up system can be arranged in the electrical pump 107, at the TCU 101, between the electrical pump 107 and the TCU 101 and/or at an alternative location in the system 1.

In this embodiment, the electrical pump 107 of the electrical pump 107 is powered by means of an electric power supply, e.g. battery 119. The hydraulic circuit is arranged for generating the pressure by means of an electric pump 107, the electric pump being operated by means of a pump controller 105. The back-up system includes an energy storage unit configured to store an amount of energy usable for independently powering at least the electric pump controller 105 for the predetermined period of time, wherein in case of the operational interruption of the TCU 101, the operation of the electric pump 107 is maintained by means of the pump controller 105 such that the pressure remains above the predetermined pressure threshold for maintaining the park lock system 111 in position during said predetermined period of time.

Figure 4:
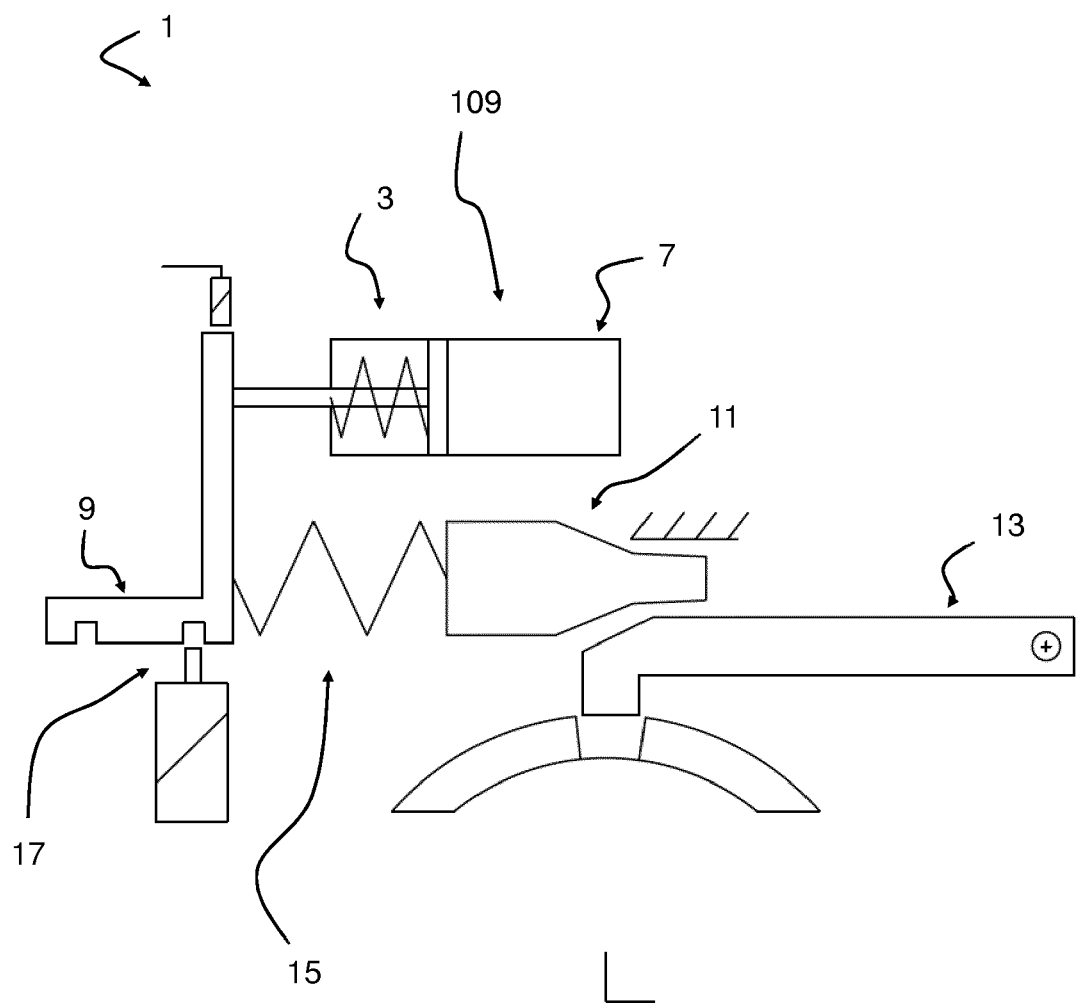
FIG. 4 shows a schematic diagram of an embodiment of a hydraulic system.

FIG. 4 shows a schematic diagram of a hydraulic system 1. The hydraulic system 1 can include: a hydraulic circuit arranged for generating a pressure; a hydraulic actuator 109 arranged for engaging a park lock system, wherein the hydraulic actuator 109 is hydraulically connected to the hydraulic circuit for actuation of the hydraulic actuator 109 using the pressure, and a back-up system (not shown) configured to keep the pressure above a predetermined pressure threshold for maintaining an actuation of the hydraulic actuator 109 for a predetermined period of time in case of an operational interruption of a transmission control unit of the vehicle.

Mainly the park-lock system is depicted in FIG. 4. In this example, the park lock system is normally closed (armed) by a spring. The park lock system can be released by hydraulic pressure. Further, the park lock system comprises means for releasing the park lock system in case of failure. A locking mechanism may be arranged for securing a current state of the park lock system. An arming spring 3 is arranged which exerts a force on the hydraulic actuator 109 comprising a piston 7. In the absence of hydraulic pressure, the arming spring 3 will move the intermediate body 9 to move a cone 11 which engages the park pawl 13. In case the park pawl 13 cannot be engaged (tooth-to-tooth with the park gear), an engage spring 15 is preloaded which is pushing to the cone 11. As soon as the vehicle (not shown) starts rolling the park can be engaged by the cone 11 engaging the park pawl 13. The arming spring 3 is stronger than the engage spring 15. The park lock system 1 is released by applying pressure to the piston 7, moving the intermediate body 9 in the opposite direction, moving the cone 11 away from the park pawl 13, where the park pawl 11 is released from the park gear by a third spring (not shown). The state of the intermediate body can be locked by the locking element 17 assuring a state of release (non-park) or armed (park) independent of the current state of hydraulic pressure.

Advantageously, the park lock can be armed in case of electric power failure and the park can be overruled (engage/disengage, lock/release) by means of a dedicated arrangement.

During operational interruptions of the TCU (e.g. TCU resets), the operation of the pump can be maintained such that the pump can continue to pump for keeping the hydraulic pressure above a predetermined threshold. In this way, no additional locking feature (e.g. solenoid operated) is needed for locking the park-lock system during such operational interruptions. The pump can operate independently even during an operational interruption of the TCU, so that its operation is not halted as a result.

The back-up system may include a capacitor arranged for covering/bridging at least one TCU reset (e.g. 100 ms, 200 ms). The predetermined period of time may depend on the specification of the employed TCU. For example, the capacitor may be configured to enable independent operation of the pump for a predetermined time period of up to approximately 260 ms, which may cover at least one TCU reset.

Figure 5:
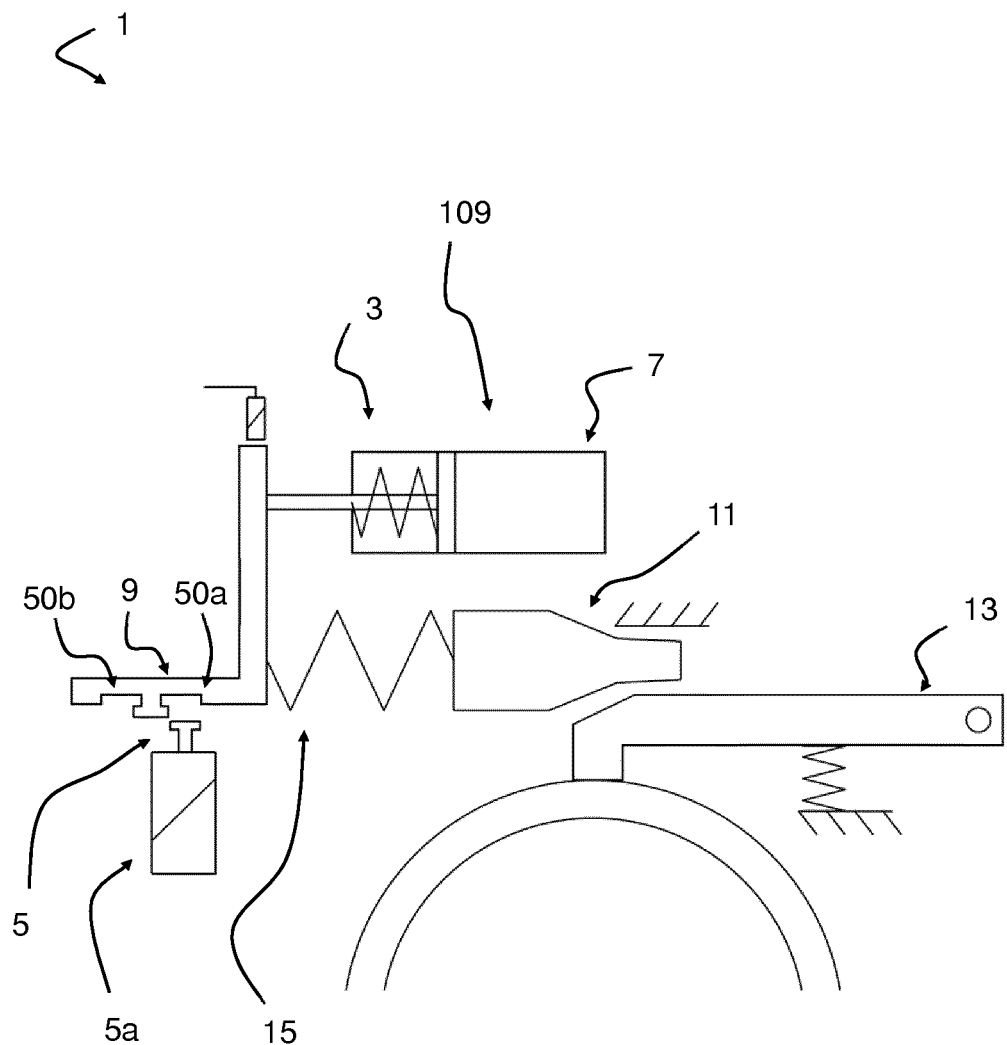
FIG. 5 shows a schematic diagram of an embodiment of a hydraulic system.

FIG. 5 shows a schematic diagram of a hydraulic system 1. The hydraulic system 1 can include: a hydraulic circuit arranged for generating a pressure; a hydraulic actuator 109 arranged for engaging a park lock system, wherein the hydraulic actuator 109 is hydraulically connected to the hydraulic circuit for actuation of the hydraulic actuator 109 using the pressure, and a back-up system configured to keep the pressure above a predetermined pressure threshold for maintaining an actuation of the hydraulic actuator 109 for a predetermined period of time in case of an operational interruption of a transmission control unit of the vehicle.

In this embodiment, the hydraulically actuated park lock system is provided with an override system comprising an override element 5. The present exemplary embodiment further provides a park lock override function to the park lock system. Especially in the event the park lock is default engaged in case of absence of hydraulic pressure and/or electric power, there may be a need for an override function, e.g. for allowing movement of a vehicle in the absence of hydraulic pressure and/or electric power, such as during towing or maintenance.

In this example, override actuator 5a provides switching of the override element 5 between an engaged (prevent park lock function) and an unengaged position (normal park lock operation). The engaged override element 5 will lock into a retainer feature 50a provided on intermediate body 9. When the intermediate body 9 and the override element 5 are locked together, the position of the intermediate body 9 will be fixed. Hence preventing the park lock system 50 from going into an engaged position.

In this example, the override actuator 5a is arranged to be extended, into engaged position, when actuated, here by applying electric current to a solenoid of the override actuator. The override actuator is arranged to be retracted when not actuated, here when no electric current is applied to the solenoid.

Here the override element 5 takes the form of a retainer. It will be appreciated that the override element 5 engages with a matching retainer feature 50a of the intermediate body when extended. It will also be appreciated that if, when engaged, the override actuator 5a is switched from an actuated to a non-actuated mode, the override element 5 and retainer feature 50a prevent the override actuator from retracting, and thus from disengaging. Thus, it is provided that the override remains actuated even in case power is interrupted. For disengaging the override actuator, here a small movement of the intermediate body suffices to disengage the override element 5 from the retainer feature 50a and allow the override actuator 5a to retract.

In one aspect of the present embodiment, the override element 5 may be switched by a control unit of the vehicle (not shown), for example a TCU unit (not shown). This has the advantageous effect that the control unit remains in control, whereas solutions employing mechanical override can cause unintended roll away of the vehicle. In addition, an advantageous aspect of TCU control over switching of override function is theft prevention.

According to an other aspect, the provided override system may be arranged to maintain the park lock in an unengaged position. Optimally, in override the override system consumes no power. In the example this is i.a. achieved by use of the override element 5 and retainer feature 50a. Hence, the park lock can be maintained in override for prolonged periods of time, e.g. during towing, without draining vehicle power.

In an other aspect the override system may be arranged to be switched out of override, i.e. returning the park lock system back to normal behaviour, using the control unit of the vehicle (not shown), here, for actuating the intermediate body 9. This can e.g. provide an advantage in that the override function cannot be deactivated without user control of the control unit. Hence, e.g. unsafe situations may be avoided.

In the present embodiment the park lock override system comprises a single override actuator 5. It will be appreciated that an arrangement with a separate override actuator is also possible. A plurality of override actuators may be used. In this example, the normal position of override actuator 5a is in the unengaged position.

An override function of the present override system can comprise the following sequence of steps; using hydraulic pressure to hydraulic actuator 109 to revert an engaged park lock to an unengaged sate; engaging the override actuator 5a; reducing the hydraulic pressure, thereby engaging the override element 5 and retainer feature 50a; and subsequently disengaging the override actuator 5a. The override function will then remain enabled because the override element 5 is locked into intermediate body 9.

Switching the override element 5 back to an unengaged position from an engaged position, thereby bringing the park lock system back to standard park function, comprises applying hydraulic pressure to hydraulic actuator 109 while the override actuator 5a is in an unengaged state. This allows the override element 5 and retainer feature 50a to disengage, and in turn the override actuator 5a to retract. Advantageously, the override system can be armed in case of electric power failure by means of a dedicated arrangement.

Similarly the override element 5 can be locked in a park lock state using the retainer feature 50b.

The electrical pump can be configured for maintaining the line pressure when the TCU loses control for a brief moment, e.g. as a result of an operational interruption. Typically operational interruptions of the TCU are caused by a reset for instance when the TCU is stuck or non-responsive.

The pump can have its own dedicated controller which can be supplied with power by means of a capacitor in order to bridge during a period of time needed for covering an operational interruption of the TCU (e.g. one or more TCU resets).

Advantageously, no separate mechanical actuator is needed for preventing the transmission from going to the park state during an operational interruption such as a TCU reset. As a result, a simpler and cheaper transmission can be obtained.

Figure 6:
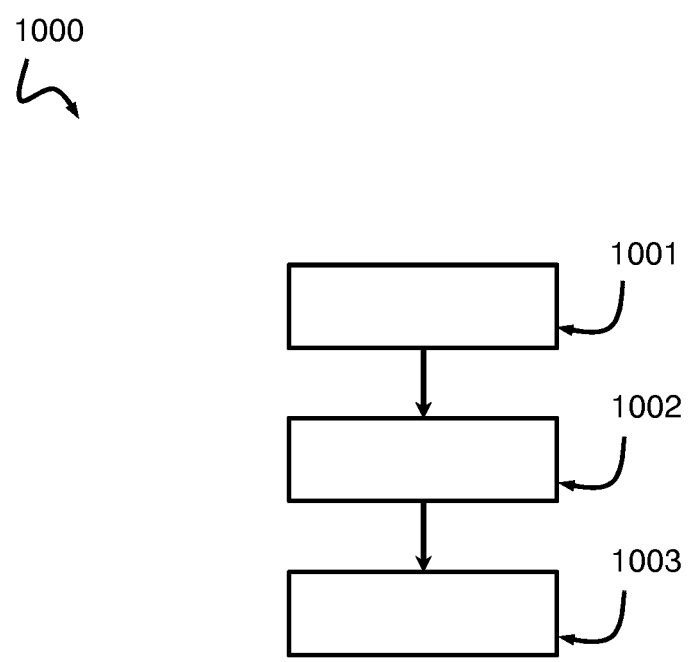
FIG. 6 shows a schematic diagram of a method.

FIG. 6 shows a schematic diagram of a method 1000 for operating a park lock system of a vehicle transmission. In a first step 1001, a pressure is generated using a hydraulic circuit. In a second step 1002, a hydraulic actuator is provided which is arranged for engaging the park lock system, the hydraulic actuator being hydraulically connected to the hydraulic circuit for actuation of the hydraulic actuator using the pressure. In a third step 1003, a back-up system is employed for keeping the pressure above a predetermined pressure threshold for maintaining an actuation of the hydraulic actuator for a predetermined period of time in case of an operational interruption of a transmission control unit of the vehicle.

The pump pressure required for actuating the hydraulic actuator can be retained during the predetermined period of time covering the time required for performing one or more (successive) TCU resets.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A hydraulic system for a vehicle transmission, comprising:
    a hydraulic circuit arranged for generating a pressure,
        a hydraulic actuator arranged for engaging a park lock system, wherein the hydraulic actuator is hydraulically connected to the hydraulic circuit for actuation of the hydraulic actuator using the pressure, and
        a back-up system configured to keep the pressure above a predetermined pressure threshold for maintaining an actuation of the hydraulic actuator for a predetermined period of time in case of an operational interruption of a transmission control unit of the vehicle.

2. The hydraulic system according to claim 1, wherein the hydraulic circuit is arranged for generating the pressure by an electric pump, the electric pump being operated by a pump controller,
    wherein the back-up system includes an energy storage unit configured to store an amount of energy usable for independently powering at least the electric pump controller for the predetermined period of time, wherein in case of the operational interruption of the transmission control unit, the operation of the electric pump is maintained by the pump controller such that the pressure remains above the predetermined pressure threshold for maintaining the park lock system in position during said predetermined period of time.

3. The hydraulic system according to claim 1, wherein the park lock system is maintained in a non-park position or park position.

4. The hydraulic system according to claim 1, wherein the predetermined period of time in which the operation of the electric pump is maintained covers a duration required for performing one or more resets of the transmission control unit.

5. The hydraulic system according to claim 1, wherein the energy storage unit includes a capacitor configured to be charged during normal operation, wherein the capacitor is configured to discharge the stored amount of electrical energy such as to enable continuation of the operation of the electric pump during the predetermined period of time.

6. The hydraulic system according to claim 1, wherein the predetermined period of time includes 1 to 5 times a duration required for performing one transmission control unit reset.

7. The hydraulic system according to claim 1, wherein the predetermined period of time is in a range of 20 to 2000 ms.

8. The hydraulic system according to claim 1, wherein the electric pump controller is separate from the transmission control unit.

9. The hydraulic system according to claim 1, wherein the electric pump controller is arranged at the electric pump.

10. The hydraulic system according to claim 1, wherein the hydraulic actuator is arranged for bringing or maintaining the park lock system in a park position when the pressure is below the predetermined pressure threshold.

11. The hydraulic system according to claim 1, wherein the hydraulic actuator includes an actuator arranged for maintaining the park lock system in a park position or in a non-park position according to a last input of an operator of the hydraulic system when the pressure is below the predetermined pressure threshold.

12. A vehicle transmission, including a hydraulic system according to claim 1, the vehicle transmission comprising:
    a park lock system arranged to engage park lock when pressure is below the predetermined threshold and/or electric power is off; and
    an override system for overriding the park lock system such that the park lock system can be selectively disengaged in case pressure is below the predetermined threshold and/or electric power is off.

13. The vehicle transmission according to claim 12, wherein the override system is arranged to be switched out of override, bringing the park lock system back from an unengaged position to normal behavior.

14. The vehicle transmission according to claim 12, wherein the override system and the park lock system use a same actuator for maintaining the park lock system in a park position or non-park position and for overriding the park lock system.

15. The vehicle transmission according to claim 12, wherein the override system includes a retainer for mechanically preventing releasing of the override system upon deactivating of the override system.

16. The vehicle transmission according to claim 12, wherein the override system is arranged to selectively maintain the park lock in a non-park position or a park position.

17. The vehicle transmission according to claim 16, wherein the override system is arranged to maintain the park lock in the non-park position or the park position without using an electric power.

18. The vehicle transmission according to claim 12, wherein the override system is arranged to be switched to override using the transmission control unit.

19. The vehicle transmission according to claim 12, wherein the vehicle transmission includes two or more friction elements, the hydraulic circuit being arranged for actuating the two or more friction elements using the pressure, wherein during the predetermined period of time, the pump controller operates the electric pump such that the pressure is reduced below a kiss point for the two or more friction elements.

20. A vehicle comprising the vehicle transmission according to claim 12.

21. A vehicle transmission, including the hydraulic system according to claim 1.

22. A method for operating a park lock system of a vehicle transmission, including:
generating a pressure using a hydraulic circuit,
providing a hydraulic actuator arranged for engaging the park lock system, the hydraulic actuator being hydraulically connected to the hydraulic circuit for actuation of the hydraulic actuator using the pressure,
wherein a back-up system is employed for keeping the pressure above a predetermined pressure threshold for maintaining an actuation of the hydraulic actuator for a predetermined period of time in case of an operational interruption of a transmission control unit of the vehicle.

23. The method according to claim 22, wherein the pressure is generated using an electric pump, and wherein the back-up system is provided for storing an amount of energy used for independently powering at least the electric pump controller for the predetermined period of time, wherein in case of the operational interruption of the transmission control unit, the operation of the electric pump is maintained by the pump controller such that the pressure remains above the predetermined pressure threshold for maintaining the park lock system in position during said predetermined period of time.

* * * * *